US011534677B2

(12) United States Patent
Strangfeld

(10) Patent No.: US 11,534,677 B2
(45) Date of Patent: Dec. 27, 2022

(54) BOARD GAME SYSTEM AND METHOD

(71) Applicant: Sony Interactive Entertainment Europe Limited, London (GB)

(72) Inventor: Kathrin Carolin Strangfeld, London (GB)

(73) Assignee: Sony Interactive Entertainment Europe Limited

( * ) Notice: Subject to any disclaimer, the term of this patent is extended or adjusted under 35 U.S.C. 154(b) by 285 days.

(21) Appl. No.: 16/621,474

(22) PCT Filed: Jun. 13, 2018

(86) PCT No.: PCT/GB2018/051610
§ 371 (c)(1),
(2) Date: Dec. 11, 2019

(87) PCT Pub. No.: WO2018/229481
PCT Pub. Date: Dec. 20, 2018

(65) Prior Publication Data
US 2020/0188770 A1    Jun. 18, 2020

(30) Foreign Application Priority Data

Jun. 16, 2017    (GB) .................................... 1709630

(51) Int. Cl.
*A63F 3/00*        (2006.01)
*A63F 9/24*        (2006.01)

(52) U.S. Cl.
CPC ...... *A63F 3/00643* (2013.01); *A63F 3/00261* (2013.01); *A63F 9/24* (2013.01);
(Continued)

(58) Field of Classification Search
CPC .... A63F 3/00643; A63F 3/00261; A63F 9/24; A63F 2003/00264; A63F 2003/00646;
(Continued)

(56) References Cited

U.S. PATENT DOCUMENTS 5,853,327 A * 12/1998 Gilboa .................. A63F 13/235
273/237
6,102,397 A    8/2000 Lee et al.
(Continued)

FOREIGN PATENT DOCUMENTS

KR    20140007997 A    1/2014
WO      9802220 A1    1/1998
(Continued)

OTHER PUBLICATIONS

Combined Search and Examination Report for Application No. GB 1709630.6 dated Oct. 23, 2017, 6 pages.
(Continued)

*Primary Examiner* — Michael D Dennis
(74) *Attorney, Agent, or Firm* — Lerner, David, Littenberg, Krumholz & Mentlik, LLP

(57) ABSTRACT

A board game system comprises a game board, having a surface adapted to receive a board game overlay, a detector array adapted to detect the respective positions of a plurality of game pieces placed on top of the board game overlay, and a transmitter adapted to transmit data indicating the respective positions to an entertainment device; and an entertainment device, having a receiver adapted to receive from the game board data indicating the respective positions of the plurality of game pieces, a game state analyser operable to update the state of a game in dependence upon the indicated respective positions of the plurality of game pieces, and an image generator operable to generate an image for output to a display, the content of the image being responsive to the detected state of the game.

12 Claims, 5 Drawing Sheets

(52) U.S. Cl.
CPC ............... *A63F 2003/00264* (2013.01); *A63F 2003/00646* (2013.01); *A63F 2003/00662* (2013.01); *A63F 2009/2408* (2013.01); *A63F 2009/2447* (2013.01)

(58) Field of Classification Search
CPC .... A63F 2003/00662; A63F 2009/2408; A63F 2009/2447; A63F 13/215; A63F 13/214; A63F 13/63; A63F 13/95; A63F 3/00006; A63F 13/213; A63F 13/218; A63F 2003/00274; A63F 2003/00347; A63F 2009/2442; A63F 2009/2489; A63F 2250/1005
See application file for complete search history.

(56) References Cited

U.S. PATENT DOCUMENTS

| | | | | |
|---|---|---|---|---|
| 6,460,851 | B1* | 10/2002 | Lee | A63F 3/00643 273/238 |
| 7,273,212 | B1 | 9/2007 | Koibaba | |
| 2003/0148806 | A1 | 8/2003 | Weiss | |
| 2005/0288078 | A1 | 12/2005 | Cheok et al. | |
| 2006/0175753 | A1* | 8/2006 | MacIver | A63F 3/00643 463/43 |
| 2010/0062846 | A1* | 3/2010 | Orlinsky | A63F 13/00 463/30 |
| 2010/0144430 | A1 | 6/2010 | Graham et al. | |
| 2011/0042894 | A1* | 2/2011 | Rylander | A63F 3/00643 273/237 |
| 2011/0165923 | A1* | 7/2011 | Davis | A63F 13/213 463/1 |
| 2013/0244784 | A1* | 9/2013 | Assa | A63F 13/31 463/40 |
| 2014/0038720 | A1 | 2/2014 | Reeskamp et al. | |
| 2015/0265912 | A1* | 9/2015 | Ward | A63F 3/04 273/287 |
| 2018/0207518 | A1* | 7/2018 | McClard | G01V 3/38 |

FOREIGN PATENT DOCUMENTS

| | | |
|---|---|---|
| WO | 2013142518 A1 | 9/2013 |
| WO | 2015113358 A1 | 8/2015 |

OTHER PUBLICATIONS

International Search Report including the Written Opinion from Application No. PCT/GB2018/051610 dated Jan. 29, 2019, 22 pages.

* cited by examiner

BOARD GAME SYSTEM AND METHOD

CROSS REFERENCE TO RELATED APPLICATIONS

The present application is a national phase entry under 35 U.S.C. § 371 of International Application No. PCT/GB2018/051610, filed on Jun. 13, 2018, which claims the benefit of Great Britain Patent Application No. 1709630.6, filed on Jun. 16, 2017, the disclosures of which are hereby incorporated herein by reference.

The present invention relates to a board game system and method.

Recently, videogames have benefited from the commonplace provision of video cameras in association with the videogame console, in order to provide richer gaming experiences. These experiences may rely on detecting actions and gestures of the user, for example through skeletal modelling or tracking distinct objects by the user, such as the PlayStation Move® controller, which comprises a glowing ball that can be tracked within the captured video image.

Alternatively, the experience may rely on detecting the state of a peripheral with suitable fiduciary markings enabling its identification, such as the EyePet® magic card, used to control the position of augmented reality toys that the EyePet could interact with (see for example https://www.youtube.com/watch?v=a_ntawCFB68), or more recently the WonderBook®, a board book comprising different fiduciary markers on each page, enabling augmentation of an image comprising the book to resemble a magic pop-up book (see for example https://www.youtube.com/watch?v=bU_yfqe8UgI).

However these experiences are primarily solitary and assume a configuration in which the peripheral is placed between the user and the TV/camera.

This makes it difficult to use these peripherals in a family setting where for example users may wish to sit opposite each other, potentially obscuring the peripheral from the camera.

The present invention seeks to mitigate or address this problem.

In a first aspect, a game board is provided in accordance with claim 1.

In another aspect, a system is provided in accordance with claim 7.

In another aspect, a method of interacting with a boardgame is provided in accordance with claim 11.

Further respective aspects and features of the invention are defined in the appended claims.

Embodiments of the present invention will now be described by way of example with reference to the accompanying drawings, in which.

Figure 3A:
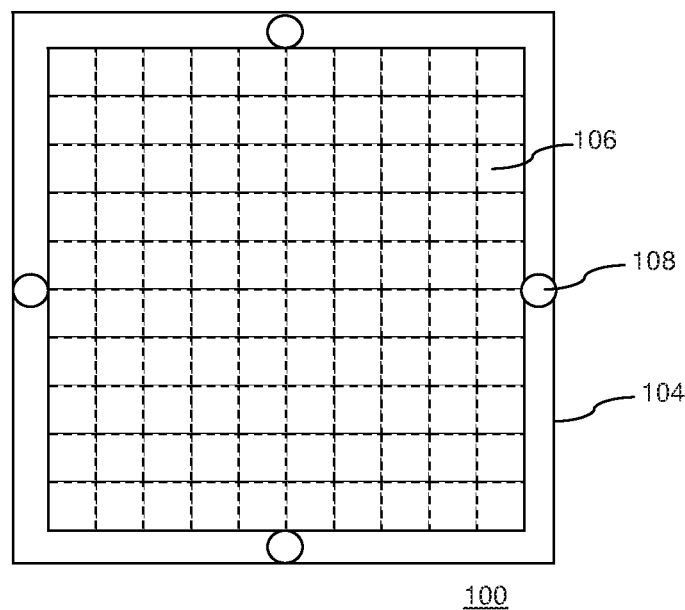
Figure 3B:
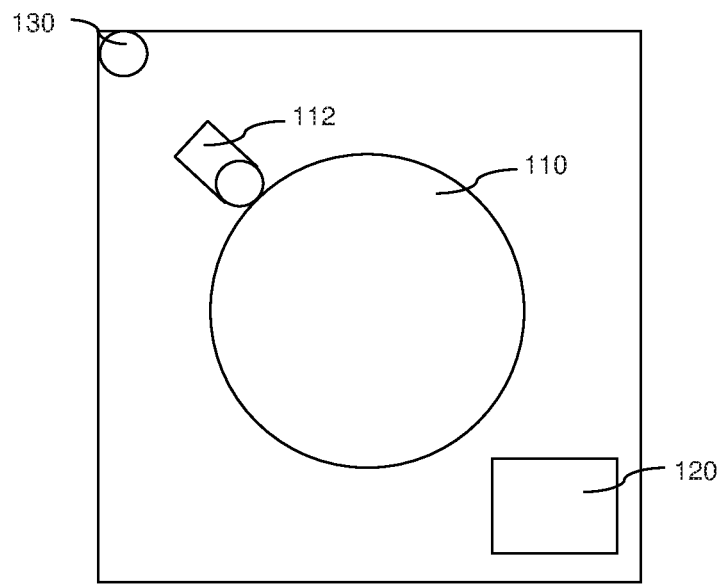
Figure 3C:
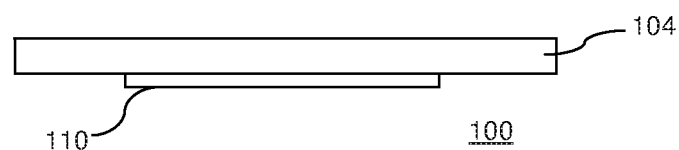
Figure 4A:
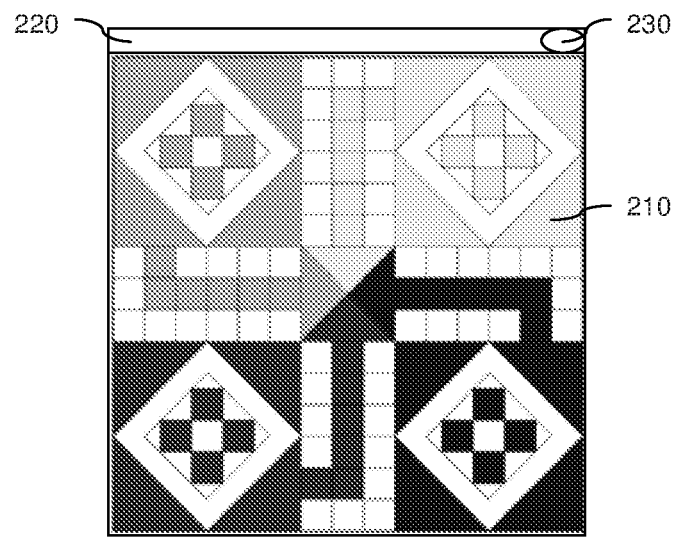
Figure 4B:
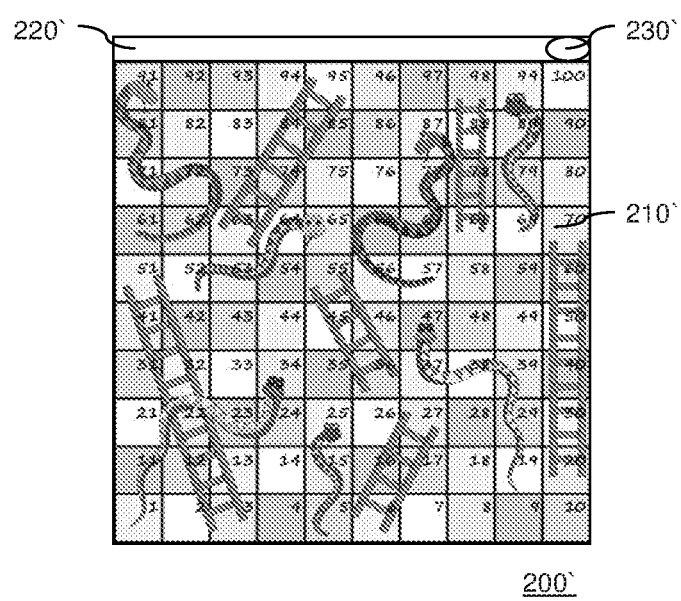
Figure 5:
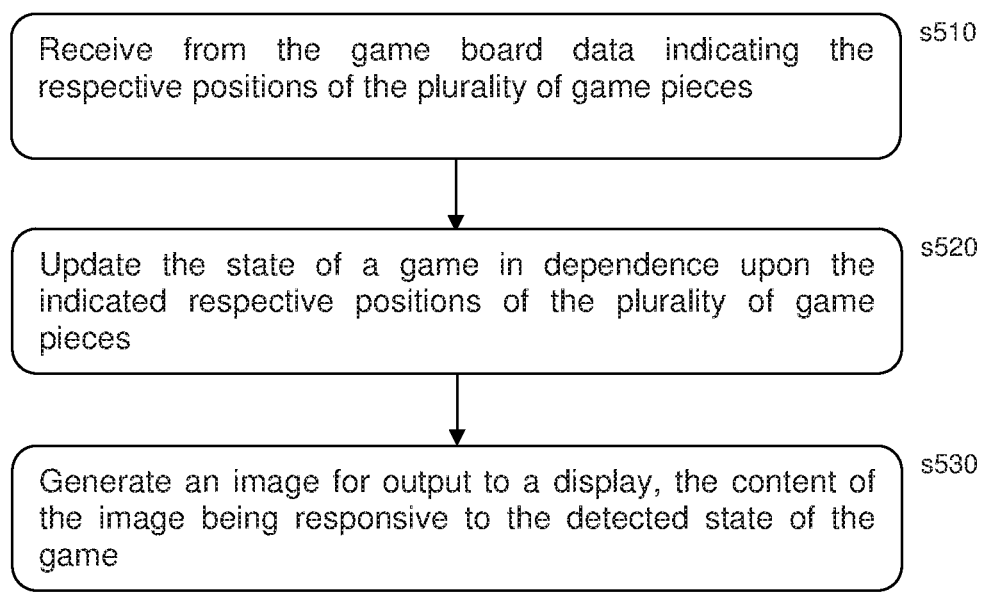

FIGS. 3A-C are schematic diagrams of a game board in accordance with an embodiment of the present invention;

FIGS. 4A and 4B are schematic diagrams of board game overlays in accordance with an embodiment of the present invention; and FIG. 5 is a flow diagram of a method of interacting with a board game in accordance with an embodiment of the present invention.

A board game system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 2:
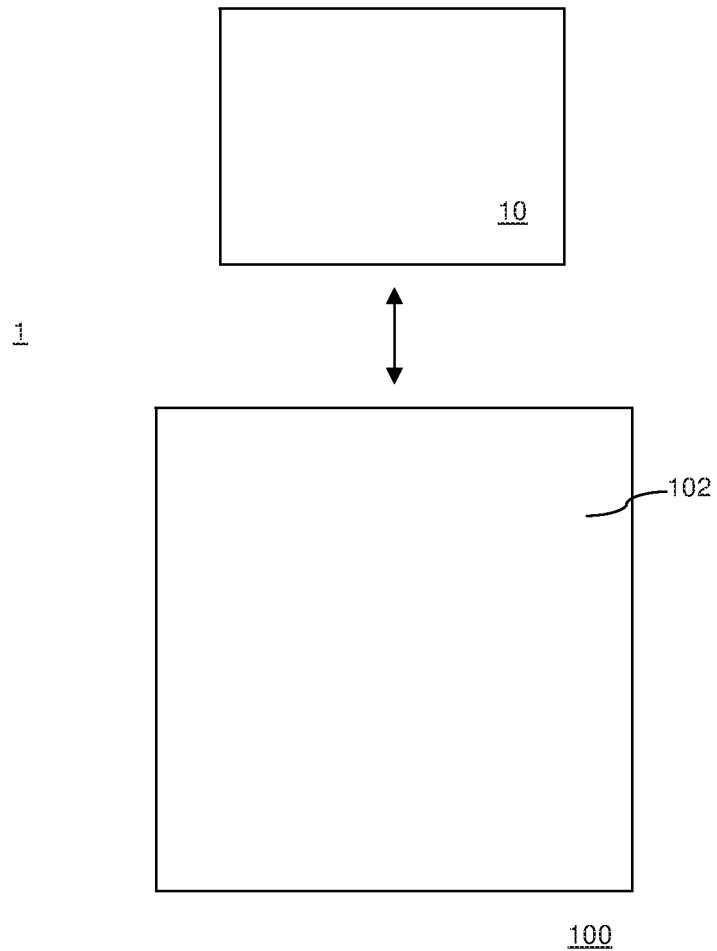
FIG. 2 is a schematic diagram of a system comprising an entertainment device and a game board, in accordance with an embodiment of the present invention.

Referring to FIG. 2, a board game system 1 comprises an entertainment device 10, such as a general purpose computer, videogame console, tablet, smartphone or cloud gaming platform, operating under suitable software instruction in accordance with an embodiment of the present invention, and a game board 100 in accordance with an embodiment of the present invention.

A non-limiting example of an entertainment device is the Sony® PlayStation 4®.

Figure 1:
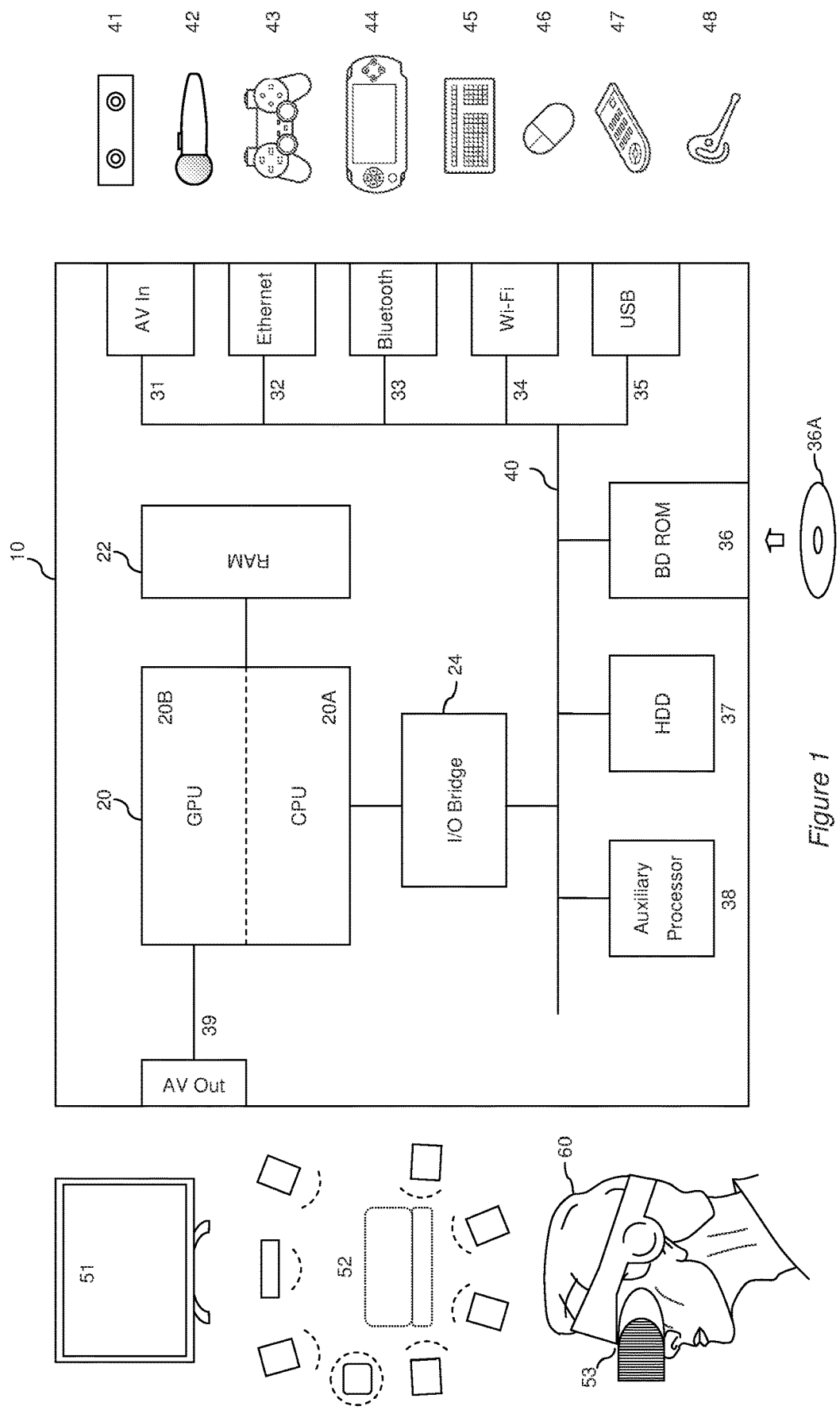
FIG. 1 is a schematic diagram of an entertainment device in accordance with an embodiment of the present invention.

FIG. 1 schematically illustrates the overall system architecture of a Sony® PlayStation 4® entertainment device. A system unit 10 is provided, with various peripheral devices optionally connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

Regarding communication, the system unit 10 may comprise 802.11 b/g/n Wi-Fi® 34; 10Base-T, 100BASE-TX and 1000BASE-T Ethernet® 32; Bluetooth 2.1® 33 and one or more USB 3.0 ports 35. The system unit may receive video and optionally audio via AV input 31. Similarly the system unit may output video and optionally audio via AV output 39 or via Bluetooth®, Wi-Fi® or USB.

Regarding peripherals, the system unit is typically provided with at least one hand-held controller 43 such as the DualShock 4®. This controller may be used to interact with user interfaces presented by the system unit that are associated with the operating system and/or a particular game or application being run by the system unit.

The user may also interact with the system unit using a video camera 41 such as the PlayStation Eye®. This may provide monoscopic or stereoscopic video images to the system unit 10 via for example AV input 31. Where these images capture some or all of the user, the user may enact gestures, facial expressions or speech as appropriate to interact with the currently presented user interface.

Alternatively or in addition, a controller designed to assist with camera-based user interaction, such as the PlayStation Move® 42, may be provided. This controller has a wand form factor and an illuminated region that facilitates detection of the controller within a captured video image. Illuminated regions may similarly be provided on other controllers 43, such as on the DualShock 4®. Both kinds of controller comprise motion sensors to detect transverse movement along three axes and rotational movement around three axes, and wireless communication means (such as Bluetooth®) to convey movement data to the system unit. Optionally such controls can also receive control data from the system unit to enact functions such as a rumble effect, or to change the colour or brightness of the illuminated region, where these are supported by the controller.

Other peripherals that may interact with the system unit 10, via either wired or wireless means, include a portable entertainment device 44, a keyboard 45, a mouse 46, a media controller 47, and a headset 48. The headset may comprise one or two speakers, and optionally a microphone.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Turning now to FIGS. 3A to 3C and 4A and 4B, the game board 100 comprises a board 102 adapted to receive a board game overlay 200 that shows the layout of a particular board game. More specifically, the board is adapted to hold the board game overlay in place during normal play of the board game.

To this end, the board may comprise one or more magnets or regions attracted to magnets (for example comprising ferrous material or any material attracted to a magnet), allowing for placement of the board game overlay by a corresponding magnet/attracted material pairing, with one on, beneath or integral to the surface and one on, beneath or integral to the board game overlay.

Similarly, the board may comprise a positively or negatively charged material that serves to attract an oppositely charged material of the board game overlay.

Similarly, the board may comprise at least a first region of a material that provides friction (such as a rubber surface) or that detachably entangles with a corresponding region of material of the board game overlay.

The above described materials (magnetic, charged, high friction or fuzzy/entangling) may form the board (hence for example the board may be made from steel sheet, a charged plastic, rubber or a roughened surface, or felt) or may be place of some or all of a board substrate made of any suitable material.

Alternatively or in addition to any of the above features of the board adapted to attract and/or retain the board game overlay, the board may contain tabs or slots that allow corresponding slots or tabs of the board game overlay to engage with the surface.

Similarly, the game board 1 may comprise an optional border 104, and the board 102 and border 104 may be arranged to provide a gap between the top surface of the board and the border near at least one part of the periphery of the board into which a corresponding part of the board game overlay 220 may be placed. Optionally the board may be bendable down away from the border, or a part of the border may be bendable or pivotable up from the border like a clip, in order to provide this gap. A restorative force caused by the return of the bent board, bent boarder or pivoted border (e.g. if sprung) would then serve to grip the board game overlay. In this case it will be appreciated that optionally no further means of retention is needed on the surface of the board 102 itself, which may then be made of any suitable material (e.g. plastic or metal).

The game board 100 also comprises a detector array 106 adapted to detect the respective positions of a plurality of game pieces placed on top of the boardgame overlay.

It will be appreciated that any suitable detection method may be considered. For example, pressure sensitive capacitive or resistive sensors may be provided on or near the surface of the board 102, or pressure sensitive capacitive or resistive layer may be provided, to detect the placement of a game piece with suitable mass to apply a detectable pressure under gravity.

Similarly magnetic detectors (solid state or reed switches) may be provided to detect a magnetic or magnetically attractive game piece, as appropriate. Similarly, photo sensors may be provided (optionally with corresponding holes/apertures in the board game overlay, or regions of sufficient transparency/translucency to detect a change in light level caused by the placement of an opaque game piece over the sensor. Other sensor schemes will be apparent to the skilled person.

FIG. 3A illustrates an example array of 100 sensors. However, it will be appreciated that different number of arrays may be appropriate, depending on the range of games that the game board is expected to support.

Hence the detector array comprise one selected from the list consisting of at least nine detectors (suitable for example for noughts and crosses/tic-tac-toe); at least 36 detectors; at least 64 detectors (suitable for example for chess); at least 100 detectors; at least 144 detectors; at least 256 detectors; and at least 361 detectors (suitable for Go). In the case of a pressure sensitive layer, the effective number of detectors may be determined logically depending on how the layer is sampled.

Separately, the game board may be of any appropriate size. Hence a typical game board may be 60 cm square as a non-limiting example, whilst a travel version of the game board for use with a portable entertainment device may be 15 cm square, again as non-limiting example. Furthermore, it is not necessary for the game board to be square; for example it may be rectangular, circular, hexagonal, or any arbitrary shape.

Example game boards sizes include those that are at least 20 cm diagonally across; at least 30 cm diagonally across; at least 40 cm diagonally across; at least 50 cm diagonally across; at least 60 cm diagonally across; at least 70 cm diagonally across; at least 80 cm diagonally across; at least 90 cm diagonally across; and at least 100 cm diagonally across.

Furthermore, the game board comprises a transmitter 120 adapted to transmit data indicating the respective positions to an entertainment device. The transmitter may for example a Bluetooth® or Wi-Fi Transmitter®. The transmitter may comprise a control unit operable to receive sensor signals from the detector array and translate these into the indicating data. This data may simply indicate the or each sensor number from which a signal is received (optionally only a signal above a predetermined threshold strength and/or duration) or may indicate the location of the sensor, for example as a grid reference. Optionally a value representing the or each sensor signal itself may be transmitted, for example after going through an analogue to digital sampling process, so that the entertainment device may analyse the signal independently.

Turning now to FIGS. 4A and 4B these illustrate boardgame overlays in accordance with an embodiment of the present invention. FIG. 4A illustrates the a boardgame overlay for the game of Ludo, whilst FIG. 4B illustrates a boardgame overlay for the game of Snakes and Ladders.

The boardgame overlay may be made of any material that complements the board; hence if the game board comprises magnetic fixing means, then the board game overlay may be made of a thin sheet of ferrous metal. Alternatively if the gable comprises mechanical fixing means such as a clip built into the border or slots within the game board surface, that any suitable material such as a paper, card or plastic sheet may be used with appropriate tabs, slots or unused regions to facilitate being physically held by the board.

The boardgame overlays illustrated in FIGS. 4a and 4B comprise as a nonlimiting example for the purposes of exhalation a tab region 220, 220' that may be inserted between the game board and border on one side of the game board. Such a tab region may be blank or may comprise decorative features or information such as the game title, enabling easy identification if such game boards are stored together in a pack.

Optionally in an embodiment of the present invention the boardgame overlay comprises a machine-readable boardgame overlay ID 230, 230'. This may be located on any part of the boardgame overlay, but in the figures it is illustrated in the tab region 220, 220', the boardgame overlay ID may for example take the form of an RFID, barcode, resistor with characteristic resistance value, punch holes to allow or prevent electrical contact on either side of the boardgame overlay, or any other suitable method of conveying an ID to an ID detector.

In this optional embodiment, the game board comprises a corresponding ID detector 130, comprising a corresponding RFID reader, barcode reader, resistance measurer, spring contacts or the like which serve to give a deterministic output for a given input provided by a board game overlay. The complexity of the ID and the associated ID detector may be a function of the number of boardgame overlays expected for use with the game board. For example, if only for was supported, then a two-bit ID would be sufficient. Meanwhile if up to 256 boardgame overlays could be anticipated or accommodated for use by the game board, then an eight bit ID would be sufficient.

Hence in this optional embodiment, a boardgame overlay ID detector (130) is adapted to detect a boardgame overlay ID (230, 230'), and the transmitter (120) is adapted to transmit data indicating the detected boardgame overlay ID to the entertainment device.

Alternatively or in addition, another optional embodiment of the game board includes a base comprising a rotatable mount (110) for the game board. This facilitates gameplay by allowing players sat around the board to rotate it to face them when it is their turn. Whilst many board games have several axes of symmetry and so do not need to be rotated, others (such as snakes and ladders) have a very clear sense of progression from bottom to top, and hence may benefit from being rotated to present a specific viewpoint to successive players.

Furthermore, as the game board is intended to cooperate with an entertainment device coupled to a television screen, it is plausible that the game board and television screen may comprise a number of common graphical features, or the television screen may provide information that corresponds to portions of the game board. Since the television is typically static and viewable in substantially the same way by each player, it may be preferable for each player to be able to rotate the game board to face them so that the relative orientation of the boardgame overlay and the television screen are similar for them.

In this optional embodiment optionally a rotation sensor (112) operable to detect the relative rotation of the board to the base is also provided. Any suitable sensor may be provided such as the rotation sensor in a volume control knob, either mounted in the axis of the rotatable mount, or mounted on a sensor physically coupled to the rotatable mount. Alternatively an optical or mechanical tracker may be used.

In this optional embodiment, the transmitter is adapted to transmit data indicating the detected relative rotation to the entertainment device.

Alternatively or in addition, another optional embodiment of the game board includes at least a first button (108), for example mounted on top of on the side of the border 104. Optionally multiple buttons may be provided, for example one for each side of the game board (if the game board has straight sides), or placed at regular intervals around the circumference of the game board border.

Again in this optional embodiment, the transmitter is adapted to transmit data indicating activation of the or each button as appropriate to the entertainment device.

Again alternatively or in addition, another optional embodiment of the game board includes a high contrast border pattern comprising two or more colours. This pattern may provide a tracking target for an entertainment device coupled to a video camera. Optionally the game board itself may comprise a fiduciary marker in the central area of the game board, enabling initial identification of the game board image analysis before the fiduciary marker is covered by a boardgame overlay; however assuming that the boardgame is not moved or only rotates about the predetermined axis of the rotatable mount (110), the high contrast border is sufficient to maintain tracking of the position of the boardgame once its approximate location has been detected.

As noted previously herein, the game board comprises a transmitter for transmitting data indicating the respective positions of game pieces (and optionally other data) to an entertainment device.

Accordingly, in an embodiment of the present invention, a system comprises the game board, and also an entertainment device (10) such as, and by way of a non-limiting example, a PlayStation 4® as Illustrated in FIGS. 1 and 2.

The entertainment device comprises a receiver (such as Wi-Fi® port 34, Bluetooth® port 33, and/or USB port 35) adapted to receive from the game board data indicating the respective positions of the plurality of game pieces.

The entertainment device also comprises a game state analyser (such as CPU 20A operating under suitable software instruction) operable to update the state of a game in dependence upon the indicated respective positions of the plurality of game pieces.

It will be appreciated that the significance and meaning of the position of a game piece on the game board will change depending upon the game being played. Consequently the entertainment device may receive an input indicating the game being played. This may be done by a user, for example by navigating a list of available games using a conventional controller, and selecting the appropriate game. Alternatively or in addition, the receiver may be adapted to receive from the game board data indicating the detected boardgame overlay ID, and select the appropriate game associated with that ID, for example in a look up table.

It will be appreciated that the boardgame overlay ID may be received from the game board in a raw or partially processed form; hence the entertainment device may receive an RFID code or binary sequence from a barcode, and then perform any necessary further processing to extract the intended ID value before comparing this with a plurality of IDs associated with respective games. Alternatively, the boardgame overlay ID may be received from the game board in a form that may be directly used to look up an associated game.

The game state analyser and or more generally the entertainment device may maintain appropriate game state data, such as scores for respective players, a record of who is turn is next, game state history, values for other aspects of the game if relevant such as whether or not a joker has been played, or whether any special condition is currently applied to the player such as whether they have to miss the next turn, or roll a particular value on a dice or the like. Typically the scores, and values for other aspects of the game are dependent upon the rules of the game itself and these are provided to the game state analyser upon selection/indication of the game being played. Hence more generally the game state analyser or equivalently the entertainment device is operable to select one of a plurality of different types of game corresponding to the boardgame overlay ID.

It will be appreciated however that whilst the game state analyser monitors the progress of the game and may act as an invigilator or enforcer of rules, the wider system of the entertainment device, game board and boardgame overlays extends beyond this mere implementation of game rules.

Hence more generally the game state analyser can act as a referee and/or as a guide, provider of hints, commentator or the like as appropriate.

The entertainment device also comprises an image generator (for example GPU 20B, optionally in conjunction with CPU 20A), operable to generate an image for output to a display, the content of the image being responsive to the detected state of the game.

Hence the entertainment device can provide a summary of progress, and/or provide graphical embellishments relating to the current state of the game, such as congratulatory messages, teasing messages, hints, indications of what the next player needs in order to achieve a particular goal (for example, needing to roll a six) or the like. Similarly, audio may be generated again for example by GPU 20B, optionally in conjunction with CPU 20A, to provide entertaining commentary, and/or questions and feedback in the case of a quiz game or a game comprising quiz elements or activity cards.

Optionally, in an embodiment of the present invention, the receiver is adapted to receive, from the game board, data indicating the detected relative rotation to the entertainment device, and the game state analyser is operable to update the state of the game in dependence upon the detected relative rotation of the entertainment device.

Hence in this optional embodiment each user could for example rotate the game board to face them (for example assuming that the boardgame overlay comprises a clear preferred orientation appearance, or that the border of the game board itself comprise indications of a preferred orientation with respect to the current player). Entertainment device can then determine which player is currently considering their turn. This advantageously avoids the need to separately interact with a controller to indicate the current player. In addition, it provides the entertainment device with information that it is the next player's turn without further input from any player; depending on the game, this may prompt the issue of a new quiz question, or the starting of a countdown timer in which to make a move or the like. Similarly, it can enable the entertainment device to determine whether a player has skipped a turn, either incorrectly or (correctly for example in the case where they are supposed to miss a turn in the game).

Alternatively or in addition, in an optional embodiment of the present invention, the receiver is adapted to receive, from the game board, data indicating activation of the or each button (108) to the entertainment device, and the game state analyser operable to update the state of the game in dependence upon the indicated activation of the or each button and the current state of the game.

Hence in this optional embodiment at least one button is provided for input. This button may for example be used to signify the end of a turn for the current player. Optionally, there are a plurality of buttons distributed around the border of the game board. Typically there would be as many buttons as there are sides to the border, although this is not essential. Where the borders circular or irregular, then as noted previously herein typically the buttons would be equally spaced around the perimeter of the border.

In this case, a respected button could be associated with a respective player by the entertainment device, and may be used to signal the start and/or end of a player's turn. Alternatively or in addition, such a button may be used to signify a special move within the game, such as playing a joker. Alternatively or in addition, such a button may be used to indicate which of a plurality of players hit their respective button first, in response to a time sensitive activity, such as answering a quiz question. In this latter case, the game board may be arranged to transmit data identifying each button as it is pressed, or may be arranged to transmit data identifying each button and the order in which they are pressed.

Variant optional embodiments of the present invention may comprise one or more of the following features:

In conjunction with a video camera coupled to the entertainment device, the entertainment device may be operable to identify the game board within a captured video image of the environment comprising the game board. The game board may be identified by a characteristic pattern on its border, and/or by a characteristic pattern on the game board itself, and/or by a characteristic pattern of a boardgame overlay. Optionally the captured video image may then be augmented with effects appropriate to the current state of the game, and output for display. However as noted previously herein, it is likely that the game board will be at least partially obscured by one or more players during use. Hence optionally the entertainment device may assume that the game board does not move (or rotates around an axis that itself does not move) and so any view of the game board (for example prior to play, or when one player temporarily moves out of the way) may be sufficient to establish its position. Suitable augmentation may then still be possible, such as a floating countdown clock above the position of the game board and the players.

In conjunction with a microphone coupled to the entertainment device (for example a microphone incorporated into a video camera) entertainment device may respond to noise, for example cries or shouts from the players, or specific spoken commands such as 'stop', where such commands may be game specific.

The entertainment device may also trigger graphical outputs based on timing (for example showing a failure animation if a response or a move on the board is not completed within a predetermined time), or in response to a game piece being lifted from or placed on the game board.

The entertainment device may capture moments of gameplay for example via a video camera, as still and/or video images, either at random, periodically, in response to noise levels, in response to a user input requesting such capture, in response to a particular in game goal being reached, or in response to a particular player either winning or being eliminated from the game.

The entertainment device may store progress (positons, scores etc) of a partially completed game for subsequent resumption. Upon resumption, the entertainment device may optionally display a representation of the boardgame together with the positions of any game pieces upon it so that the players do not have to remember their physical progress/positions on the board game.

The entertainment device may have a game authoring mode. In this mode, a user may draw a boardgame overlay of their own, specifying legal positions for game pieces on the overlay. This may be done either by drawing on a blank overlay on the game board and in the authoring mode, placing pieces in valid positions on the game board so that their transmitted positions are learned by the entertainment device, or by drawing a boardgame design and presenting this to a video camera operably coupled to the entertainment device for capture, storage and/or analysis. In this latter case, valid positions for game pieces may for example be indicated by a choice of colour in the design, or a choice of symbol such as a square or asterisk. Alternatively or in addition a captured image of the design may be displayed to the user with an overlay (e.g. a grid) indicative of the position of the game piece sensors on the game board, and the user can select valid grid positions using a conventional controller.

The user may then interact with the entertainment device to define game rules such as allowable progression on the board, and properties of any particular position on the board, for example adding or subtracting from a score, or requiring a user to progress forward or backward from their current position, or setting a timer when the user reaches a position on the board (the design of the game may then for example set another player a timed challenge as a forfeit; entertainment device may not need to know what the challenge is, only whether or not it is completed within the set time). Other potential game rules will be apparent to the skilled person, such as setting start and end positions, adding bonus scores to the first person to reach a particular position, and the like.

The entertainment device may correlate the game board with an in game virtual environment where positions in the game board can correspond to positions within the virtual environment, and a user at a given position has to overcome a challenge relating to the position; for example using a videogame controller to defeated monster, or pick a lock, or find two matching images or the like.

The entertainment device may be connected to a network, enabling two or more entertainment devices to share game state data and hence allow networked play between two sets of users. The users may each have a game board and play a shared game. Playing turns, where used by a game, may be distributed between users in the plurality of sites in any suitable manner. Users in one location may use game pieces on their board to visually track the progress of users in the other location, with the entertainment devices being operable to distinguish local and representative pieces due to their positions in relation to the shared game state. Optionally a remote user may have a specific role (for example if they do not have a game board themselves by wish to participate); hence for example quiz questions could be displayed to them via their entertainment device so that they can ask the questions in a quiz-master role, with their audio being relayed to the other entertainment device(s) for playback.

The game board may also be of a sufficient size to allow users to act as game pieces themselves, for example to adopt different physical positions in accordance with the game rules; an example of such a game is Twister®, but other activities may be considered such as yoga; in this case progress within a notional game may be achieved by correctly positioning one or more parts of the body on the game board inappropriate order or at/4 an appropriate time.

Turning now to FIG. 5, in an embodiment of the present invention, a method of interacting with a boardgame for an entertainment device, the boardgame comprising a surface adapted to receive a boardgame overlay, a detector array adapted to detect the respective positions of a plurality of game pieces placed on top of the boardgame overlay, and a transmitter adapted to transmit data indicating the respective positions to an entertainment device, comprises:

in a first step s510, receiving from the game board data indicating the respective positions of the plurality of game pieces;

in a second step s520 updating the state of a game in dependence upon the indicated respective positions of the plurality of game pieces;

and in a third step s530, generating an image for output to a display, the content of the image being responsive to the detected state of the game.

It will be apparent to a person skilled in the art that variations in the above method corresponding to operation of the various embodiments of the apparatus as described and claimed herein are considered within the scope of the present invention, including but not limited to:

receiving from the game board data indicating the detected boardgame overlay ID, and selecting one of a plurality of different types of game corresponding to the boardgame overlay ID;

receiving from the game board data indicating the detected relative rotation of the entertainment device, and updating the state of the game in dependence upon the detected relative rotation of the entertainment device;

receiving from the game board data indicating activation of the or each button to the entertainment device, and updating the state of the game in dependence upon the indicated activation of the or each button and the current state of the game; and operating in a game authoring mode, receiving inputs indicative of valid positions for game pieces on the game board, and receiving inputs defining one or more game rules.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The invention claimed is:

1. A game board, comprising:
    a board;
    a surface adapted to receive a board game overlay;
    a base comprising a rotatable mount for the game board;
    a rotation sensor operable to detect a relative rotation of the board to the base;
    a detector array adapted to detect respective positions of a plurality of game pieces placed on top of the board game overlay; and
    a transmitter adapted to transmit, to an entertainment device, data indicating the respective positions and data indicating the detected relative rotation.

2. The game board of claim 1, further comprising
    an overlay ID detector adapted to detect a board game overlay ID, and
    wherein the transmitter is adapted to transmit data indicating the detected board game overlay ID to the entertainment device.

3. The game board according to claim 1, wherein the detector array comprises one of:
    i. at least nine detectors;
    ii. at least 36 detectors;
    iii. at least 64 detectors;
    iv. at least 100 detectors;
    v. at least 144 detectors;
    vi. at least 256 detectors; or
    vii. at least 361 detectors.

4. The game board according to claim 1, wherein the dimensions of the game board are one of:
    i. at least 20 cm diagonally across;
    ii. at least 30 cm diagonally across;
    iii. at least 40 cm diagonally across;
    iv. at least 50 cm diagonally across;
    v. at least 60 cm diagonally across;
    vi. at least 70 cm diagonally across;
    vii. at least 80 cm diagonally across;
    viii. at least 90 cm diagonally across; or
    ix. at least 100 cm diagonally across.

5. The game board according to claim 1, further comprising
    at least a first button, and
    wherein the transmitter is adapted to transmit data indicating activation of the or each button to the entertainment device.

6. The game board according to claim 1, further comprising
    a board game overlay, the board game overlay comprising
    a machine-readable board game overlay ID.

7. A system comprising:
    a game board, the game board comprising
        a board;
        a surface adapted to receive a board game overlay;
        a base comprising a rotatable mount for the game board;
        a rotation sensor operable to detect a relative rotation of the board to the base;
        a detector array adapted to detect respective positions of a plurality of game pieces placed on top of the board game overlay; and
        a transmitter adapted to transmit, to an entertainment device, data indicating the respective positions and data indicating the detected relative rotation, and
    the entertainment device, the entertainment device comprising
        a receiver adapted to receive from the game board the data indicating the respective positions of the plurality of game pieces and the data indicating the detected relative rotation;
        a game state analyser operable to update the state of a game in dependence upon the data indicating the respective positions and the data indicating the detected relative rotation; and
        an image generator operable to generate an image for output to a display, the content of the image being responsive to the detected state of the game.

8. The system according to claim 7, wherein
    the receiver is adapted to receive from the game board data indicating the detected board game overlay ID; and
    the entertainment device is operable to select one of a plurality of different types of game corresponding to the board game overlay ID.

9. The system according to claim 7, wherein
    the receiver is adapted to receive from the game board data indicating activation of the or each button to the entertainment device; and
    the game state analyser is operable to update the state of the game in dependence upon the indicated activation of the or each button and the current state of the game.

10. The system according to claim 7, wherein
    the entertainment device is operable in a game authoring mode, in which;
    the entertainment device is operable to receive inputs indicative of valid positions for game pieces on the game board; and
    the entertainment device is operable to receive inputs defining one or more game rules.

11. A method of interacting with a board game for an entertainment device, the board game comprising a board, a surface adapted to receive a board game overlay, a base comprising a rotatable mount for the game board, a rotation sensor operable to detect the relative rotation of the board to the base, a detector array adapted to detect respective positions of a plurality of game pieces placed on top of the board game overlay, and a transmitter adapted to transmit, to the entertainment device, data indicating the respective positions and data indicating the detected relative rotation, the method comprising the steps of:
    receiving from the game board the data indicating the respective positions and the data indicating the detected relative rotation;

updating the state of a game in dependence upon the data indicating the respective positions and the data indicating the detected relative rotation; and generating an image for output to a display, the content of the image being responsive to the detected state of the game.

12. A non-transitory computer readable medium having computer executable instructions adapted to cause a computer system to perform the method of interacting with a board game for an entertainment device, the board game comprising a board, a surface adapted to receive a board game overlay, a base comprising a rotatable mount for the game board, a rotation sensor operable to detect the relative rotation of the board to the base, a detector array adapted to detect respective positions of a plurality of game pieces placed on top of the board game overlay, and a transmitter adapted to transmit, to the entertainment device, data indicating the respective positions and data indicating the detected relative rotation, the method comprising the steps of:

receiving from the game board the data indicating the respective positions and the data indicating the detected relative rotation;

updating the state of a game in dependence upon the data indicating the respective positions and the data indicating the detected relative rotation; and generating an image for output to a display, the content of the image being responsive to the detected state of the game.

* * * * *